United States Patent
Matsubara et al.

(10) Patent No.: US 6,239,518 B1
(45) Date of Patent: May 29, 2001

(54) AC GENERATOR FOR VEHICLE

(75) Inventors: Kenichiro Matsubara, Chiyoda; Toshiyuki Innami, Tsuchiura; Masami Takano, Hitachinaka; Osamu Suzuki, Chiyoda; Hiroshi Kanazawa, Hitachioota; Yuzo Kadomukai, Ishioka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/512,806

(22) Filed: Feb. 25, 2000

(30) Foreign Application Priority Data

Mar. 17, 1999 (JP) .................................................. 11-071411

(51) Int. Cl.[7] ............................. H02K 15/14; H02K 5/20; H02K 9/19
(52) U.S. Cl. ............................. 310/58; 310/59; 310/60 R; 310/60 A
(58) Field of Search ................................. 310/54, 64, 89, 310/60 R, 58–61, 261, 263; 29/596–598

(56) References Cited

U.S. PATENT DOCUMENTS 3,819,965 * 6/1974 Schoendube ........................... 310/58
5,519,269 * 5/1996 Lindberg ............................... 310/58
5,616,973 * 4/1997 Khazanov et al. ..................... 310/54
5,886,433 * 3/1999 Oda et al. .............................. 310/59

FOREIGN PATENT DOCUMENTS

| 41 04 740 A1 | 8/1991 | (DE) . |
| 0 589 187 A1 | 3/1994 | (EP) . |
| 2 717 640 | 9/1995 | (FR) . |
| 7-336946 | 12/1995 | (JP) . |
| 10-225060 | 8/1998 | (JP) . |
| WO 97/44882 | 11/1997 | (WO) . |

* cited by examiner

*Primary Examiner*—Nestor Ramirez
*Assistant Examiner*—Tran Nguyen
(74) *Attorney, Agent, or Firm*—Antonelli, Terry, Stout & Kraus, LLP

(57) ABSTRACT

In an AC generator for a vehicle, a housing is formed at one end thereof with an end plate portion, a plurality of axial cooling liquid passages are provided in a body portion of the housing, and a circumferential cooling liquid passage and a radial cooling liquid passage each connecting the axial cooling liquid passages adjacent to each other are provided in an axial end face of the housing and the end plate portion, respectively.

9 Claims, 6 Drawing Sheets

AC GENERATOR FOR VEHICLE

FIELD OF THE INVENTION

This invention relates to an AC generator for vehicle which is to be driven by an engine of a vehicle and particularly to the technology to cool heating portions of the AC generator.

BACKGROUND OF THE INVENTION

A general AC generator for vehicle comprises a housing in which a stator including stator cores and stator coils wound thereon is fitted, a rotor including a rotary shaft and pole cores fitted thereon, field coils by which the pole cores are magnetized, brackets for supporting the rotor through bearings, a rectifier, and a voltage regulator, the rotor being supported at the neighborhood of opposite ends thereof through the bearings so as to be able to rotate inside the stator. Main heating portions of this type of AC generator for vehicle are the stator cores, stator coils, rectifier, voltage regulator and so on.

An example of cooling means of the AC generator for vehicle is disclosed in JP-A-10-225060. It is disclosed in this publication that the cooling means comprises a first cooling liquid passage through which a cooling liquid is made to flow and which is provided around a stator, e.g. a passage provided in the wall of a housing, and a second cooling liquid passage through which the cooling liquid is made to flow and which is provided around a rectifier and a voltage regulator, e.g. a passage provided in a bracket to which the rectifier and the voltage regulator are to be mounted, the first and second cooling liquid passages being connected in series. It is also disclosed that a third cooling liquid passage is provided in another bracket and connected to the second cooling liquid passage through the first cooling liquid passage.

In the prior art described above, however, the cooling liquid passages are provided separately in the housing, the front bracket and the rear bracket, so that the structure is complicated. This gave rise to the problems of an increase in the mass of parts and a rise in the cost needed for connecting the cooling liquid passages.

SUMMARY OF THE INVENTION

It is an object of the present invention to provide an AC generator for vehicle in which a cooling liquid passage simple in structure and easy to assemble is provided and heating portions can be cooled effectively.

In order to achieve the above object, in an AC generator for vehicle according to the invention, a housing enclosing a rotor and a stator is integrally formed therein with a plurality of axial passages through which a liquid is made to flow in the direction of a rotary shaft of the rotor and a passage connecting the axial passages so as to be able to cool heating portions effectively.

According to the invention, the cooling passage can be integrally formed in the housing, and therefore the cooling passage becomes simple in structure and easy to assemble, and the heating portions can be cooled effectively.

DETAILED DESCRIPTION OF THE INVENTION

An AC generator for vehicle according to a first embodiment of the present invention will be described below with reference to FIGS. 1 to 4.

Figure 1:
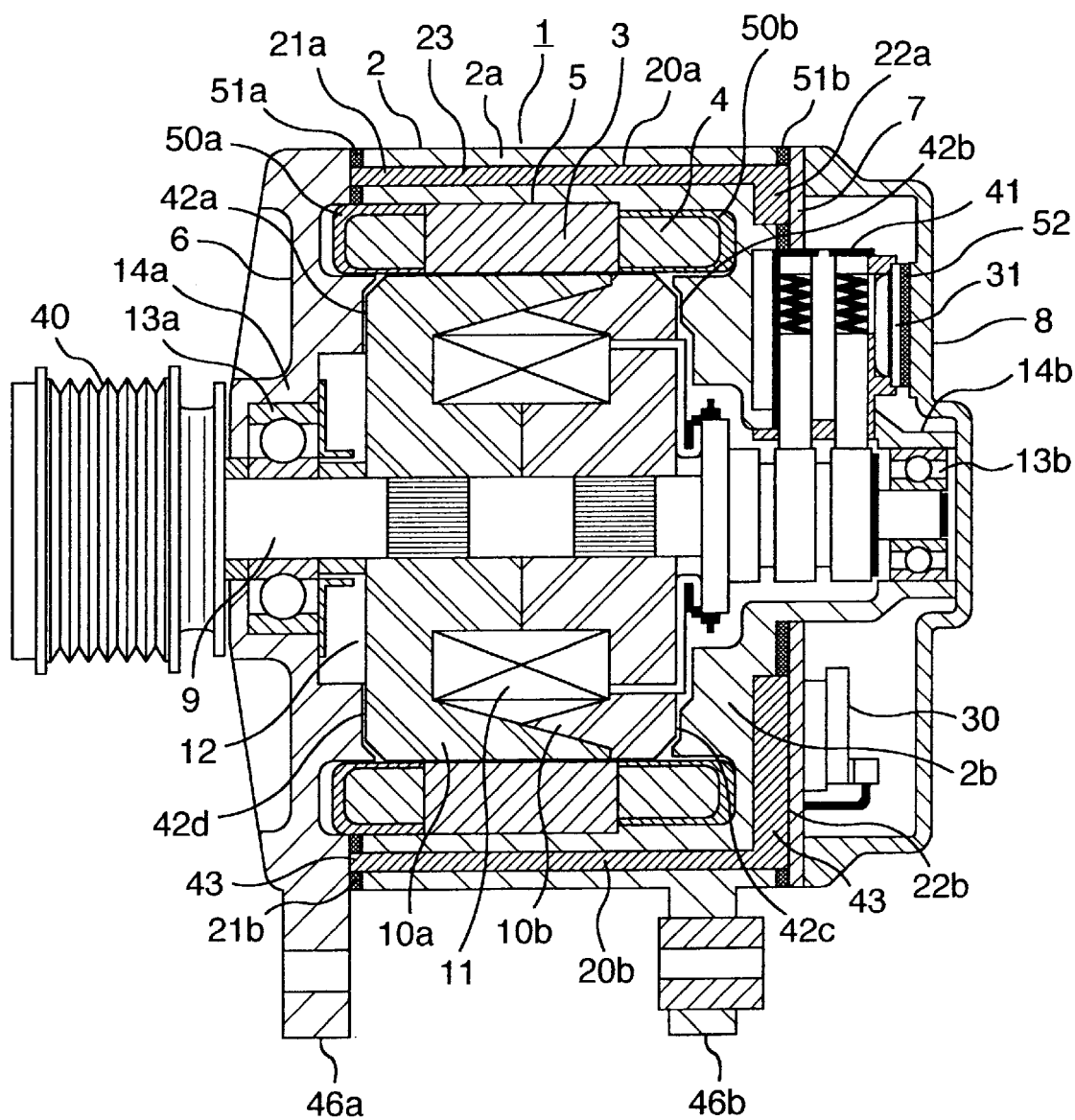
FIG. 1 is a vertically sectioned side view showing an AC generator for vehicle according to a first embodiment of the present invention.

FIG. 1 is a vertically sectioned side view of the AC generator 1 for vehicle according to this embodiment. A substantially cylindrical housing 2 is formed by die casting process, for example. In a body portion (side wall portion) 2a of the housing 2, a stator 5 formed by winding stator coils 4 on stator cores 3 is fitted by a fitting method, such as shrinkage fit, press fit, and so on.

The stator coils 4 are partly or entirely covered with good thermal conductive resins 50a, 50b of relatively high thermal conductivity such as silicone resin, and so on, and furthermore the good thermal conductive resins 50a, 50b are partly brought into close contact with the inner peripheral surface of the housing 2. However, it is also possible that the stator 5 is fitted in the housing 2 and then the spaces defined by the housing 2 and the stator coils 4 are filled with a good thermal conductive resin 50 so that the stator coils 4 are partly or entirely covered. In that case, moreover, it is possible to fill also the spaces around the stator coils 4 wound on the inner portions of the stator cores 3 with the good thermal conductive resin 50. Incidentally, the materials of the good thermal conductive resin 50, portions to be filled with the resin 50 and amounts of application of the resin 50 can be selected arbitrarily depending on the amounts of heat generated by the stator cores 3 and the stator coils 4.

A bracket 6 is fitted to one (front) end of the housing 2 through a seal 51a so as to cover this end and fixed to the housing 2 with bolts (not shown), for example. Meanwhile, a back plate 7 is fitted to the other (rear) end of the housing 2 through a seal 51b and further a rear cover 8 is fitted to the back plate 7 so as to cover it and then the back plate 7 and the rear cover 8 are integrally fixed to the housing 2 by means of screws, bolts and so on (not shown), for example.

As will be described later, the back plate 7 functions as a cover for covering concave (or groove-shaped) radial cooling liquid passages formed in an end plate portion 2b of the housing 2, that is, as a passage cover member or a groove cover member.

Moreover, a rectifier 30 is fixed to the back plate 7, and a brush peripheral equipment 41 and a voltage regulator 31 and so on are fixed to the end plate portion 2b formed integrally with the housing, respectively, by means of screws, bolts and so on (not shown). Inside the stator 5 is disposed a rotor 12 comprising a rotary shaft 9, two pole cores 10a, 10b fitted by press fit, for example, on the rotary shaft 9 in such positions so as to approximately face the inner peripheral surface of the stator 5, and field coils 11 wound on the pole cores 10a, 10b. The rotor 12 is supported by bearing holder portions 14a, 14b of the bracket 6 and the housing 2 through bearings 13a, 13b so as to be able to rotate inside the stator 5.

A pulley 40 is fitted on an end of the rotary shaft 9 projecting out of the bracket 6 and fixed thereto by means of bolts (not shown), for example. Further, the housing 2 and the bracket 6 are integrally provided with legs 46a, 46b by which the AC generator 1 for vehicle can be mounted on an engine of the vehicle (not shown).

In the wall of the body portion (side wall portion) 2a of the housing 2, a plurality of axial cooling liquid passages 20 almost parallel to the rotary shaft 9 are arranged at intervals in the circumferential direction. Pairs of adjacent axial cooling liquid passages 20 are connected by turns at their front and rear end portions so that the cooling liquid is made to flow axially through each pair of adjacent passages in opposite directions and is made to flow through all the axial cooling liquid passages 20 formed in the body portion (side wall portion) 2a of the housing 2 in order. For this purpose, in one (front) end portion of the housing 2 to which the bracket 6 is fitted, groove-shaped circumferential cooling liquid passages 21 concaved in the direction of the rotary shaft 9 are formed in the front end surface of the body portion (side wall portion) 2a of the housing 2 so as to connect the pairs of adjacent axial cooling liquid passages 20. Meanwhile, in the rear end portion of the housing 2, groove-shaped radial cooling liquid passages 22 concaved in the direction of the rotary shaft 9 are formed in the outer surface of the end plate portion 2b extending from the body portion (side wall portion) 2a toward the inner rotary shaft 9 so as to connect other pairs of adjacent axial cooling liquid passages 20 than the pairs of adjacent axial cooling liquid passages 20 connected by the circumferential cooling liquid passages 21.

The circumferential cooling liquid passages 21 are covered with the seal 51a and the bracket 6, while the radial cooling liquid passages 22 are covered with the seal 51b and the back plate 7. The series cooling liquid passage composed of these cooling liquid passages 21, 22 and the axial cooling liquid passages 20 is filled with a cooling liquid 23.

Incidentally, if the housing 2 is formed by die casting process, the axial cooling liquid passages 20, the circumferential cooling liquid passages 21 and the radial cooling liquid passages 22 can be formed easily without performing any special machining process.

Now, circulation of the cooling liquid 23 will be described by referring to FIGS. 2. FIGS. 2 show the housing 2 formed with the axial cooling liquid passages 20, the circumferential cooling liquid passages 21 and the radial cooling liquid passages 22 in side view as viewed from the side (from the direction perpendicular to the rotary shaft), in front view as viewed from the front in the direction of the rotary shaft, and in front view as viewed from the back in the direction of the rotary shaft.

One 20b of the axial cooling liquid passages 20 is provided therein with a partition portion 24 so that the passage is separated into two parts, one part (on the front side in this embodiment) being formed with a cooling liquid inlet port 25 and the other part (on the rear side in this embodiment) being formed with a cooling liquid outlet port 26.

Further, in this embodiment, eight axial cooling liquid passages 20 (20a–20h) are provided so that four pairs of adjacent axial cooling liquid passages are connected by four circumferential cooling liquid passages 21a, 21b, 21c and 21d, respectively.

Moreover, other pairs of adjacent axial cooling liquid passages 20 that are not connected by the circumferential cooling liquid passages 21 are connected by four radial cooling liquid passages 22a, 22b, 22c and 22d, respectively.

Incidentally, concerning the number of axial cooling liquid passages 20, if it is an even number such as four, six, eight, ten, and so on, the cooling liquid inlet port 25 and the cooling liquid outlet port 16 can be formed close to each other in the same manner as this embodiment. Further, if it is an odd number such as three, five, seven, nine, and so on, the cooling liquid inlet port 25 and the cooling liquid outlet port 26 can be formed in the separate axial cooling liquid passages 20 adjacent to each other, respectively, so that it is not necessary to provide the partition portion 24 in the axial cooling liquid passage 20.

The positions where the cooling liquid inlet port 25 and the cooling liquid outlet port 26 are formed greatly depend on the structure of the engine of the vehicle (not shown), and therefore, it is possible to arbitrarily select the positions where the cooling liquid inlet port 25 and the cooling liquid outlet port 26 are to be formed and, further, the number of axial cooling liquid passages 20 according to these circumstances. At this time, the numbers of circumferential cooling liquid passages 21 and of radial cooling liquid passages 22 vary with the number of axial cooling liquid passages 20.

Figure 2C:
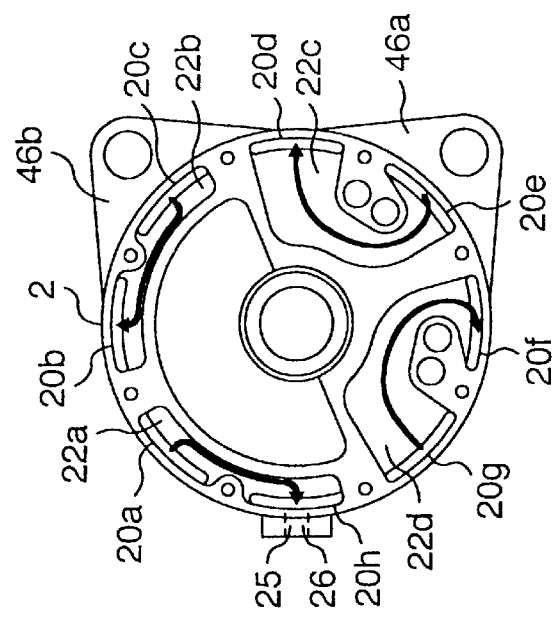
FIGS. 2A–2C are side and front views of a housing shown in FIG. 1.
Figure 2B:
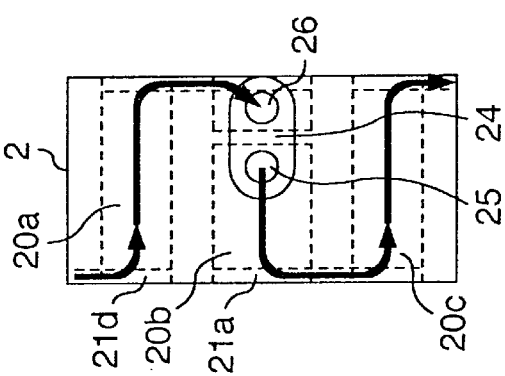
Figure 2A:
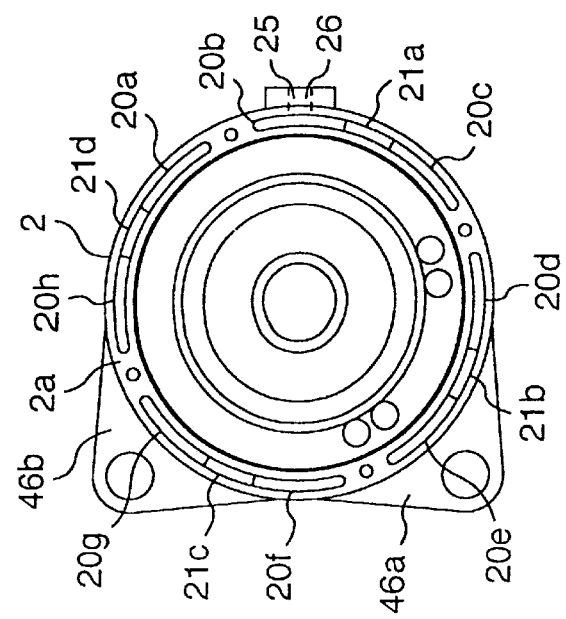

In FIGS. 2A–2C, the cooling liquid 23 caused to come in through the cooling liquid inlet port 25 by the operation of an external cooling liquid circulating apparatus (not shown) is made to flow through the cooling liquid passage in the direction shown by arrow marks until it circulates through the whole cooling liquid passage, and then it finally flows out through the cooling liquid outlet port 26 so as to be returned to the external cooling liquid circulating apparatus. In that case, in the portion (rear end portion) of the housing 2 to which the back plate 7 is fitted, the cooling liquid 23 in the axial cooling liquid passage 20 is made to flow into the radial cooling liquid passage 22 and then into the next axial cooling liquid passage 20 again.

In FIG. 1, the rotational driving force of the engine mounted on the vehicle (not shown) is transmitted through a belt and the like (not shown) to the pulley 40 so as to cause the rotor 12 to rotate inside the stator 5. At this time, the pole cores 10a, 10b have been magnetized with a predetermined polarity, respectively, by supplying current to the field coils 11, and therefore if the rotor 12 rotates inside the stator 5, an electromotive force is produced by the stator coils 4, resulting in generation of electric power.

With this generation of electric power, the stator coils 4 produce heat proportional to the square of the current that flows, and the stator cores 3 produce heat attributed to eddy current caused by the electromagnetic induction of the line of magnetic force that passes therethrough. Further, also at the rectifier 30 used to convert an alternating current output obtained by the generation of electric power to a direct current output and at the voltage regulator 31 used for controlling the amount of current that will be supplied to the field coils 11, heat is produced according to the amount of current that flows.

In the AC generator 1 for vehicle according to this embodiment, the cooling liquid passage is formed as described above and the cooling liquid 23 is made to circulate therethrough. Therefore, in FIG. 1, the heat generated at the stator coils 4 is transferred through the good thermal conductive resins 50a, 50b to the housing 2 and the stator cores 3, and the heat generated at the stator cores 3 is transferred directly to the housing 2, where the heat is further transferred to the cooling liquid 23 so as to be absorbed. On the other hand, the heat generated at the rectifier 30 is transferred through the back plate 7 to the cooling liquid 23 so as to be absorbed.

Moreover, the voltage regulator 31 is kept in contact with the rear cover 8 through a good thermal conductive member 52 of relatively high thermal conductivity as shown in FIG. 1, and therefore the heat generated at the voltage regulator 31 is transferred through the good thermal conductive member 52 to the rear cover 8 whose temperature is relatively low so as to be absorbed and radiated.

In the way described above, it is possible to avoid the extreme temperature rise in various portions, and therefore it becomes possible for the AC generator 1 for vehicle to fulfill a predetermined function continuously.

Incidentally, the heat generated at the field coils 11 may become a problem depending on the situation, and however, in the AC generator 1 for vehicle according to this embodiment, air gaps 42a, 42b, 42c and 42d defined between the bracket 6 and the pole core 10a and between the housing 2 and the pole core 10b are made small as shown in FIG. 1 so that the heat generated at the field coils 11 is transferred from the pole cores 10a, 10b through an air layer in the air gaps 42a, 42b, 42c 42d to the bracket 6 and the housing 2 so as to be absorbed or radiated.

It is noted that the size of the air gaps 42 needs to be made small to such a degree that the pole cores 10a, 10b can be prevented from coming into contact with the bracket 6 and the housing 2, preferably in the range of 0.5 to 1.5 mm.

Meanwhile, part of the heat generated at the field coils 11 is transferred through the pole cores 10a, 10b to the rotary shaft 9 as well from which it is further transferred to the bearings 13a, 13b, the pulley 40 and so on so as to be absorbed, thus performing the cooling. In connection with this, in order to absorb or radiate the heat transferred to the rotary shaft 9 and the heat generated at the bearings 13a, 13b by themselves, a good thermal conductive member (such as silicone resin, and so on) may be inserted between the rear end of the bearing holder portion 14b of the housing 2 and the rear cover 8.

Further, in the AC generator 1 for vehicle according to this embodiment, through-hole portions 43 substantially in the same shape as the circumferential cooling liquid passages 21 are formed in the seal 51a provided between the housing 2 and the bracket 6 in such positions so as to face the circumferential cooling liquid passages 21, and therefore it is possible to make the cooling liquid 23 come into direct contact with part of the bracket 6 in a liquid tight manner as shown in FIG. 1. This makes it possible to promote the cooling of the bracket 6 and, further, of the pole core 10a kept in contact therewith through the air layer in the air gaps 42.

Similarly, through-hole portions 43 substantially in the same shape as the radial cooling liquid passages 22 are formed in the seal 51b provided between the housing 2 and the back plate 7 in such positions so as to face the radial cooling liquid passages 22, and therefore it is possible to make the cooling liquid 23 come into direct contact with part of the back plate 7 in a liquid tight manner as shown in FIG. 1. This makes it possible to promote the cooling of the back plate 7 and, further of the rectifier 30 fixed thereto.

However, if the amount of heat generated at various heating portions including the field coils is small, there is no need to make the cooling liquid 23 come into direct contact with the bracket 6 and the back plate 7, and therefore it is not always necessary to form the through-hole portions 43 in the seals 51a, 51b.

Moreover, in the AC generator 1 for vehicle according to this embodiment, out of the four radial cooling liquid passages 22a, 22b, 22c and 22d, the rectifier 30 is disposed in the vicinity of the radial cooling liquid passage 22d into which the cooling liquid 23 coming in through the cooling liquid inlet port 25 is made to flow first after passing through the axial cooling liquid passage 20h, the circumferential cooling liquid passage (not shown) and the axial cooling liquid passage 20g. Therefore, the rectifier 30 can be cooled with the cooling liquid 23 of relatively low temperature fed from the external cooling liquid circulating apparatus (not shown), thereby making it possible to lower the heat resistance of the rectifier 30 as compared with that of the stator coils 4.

In other words, it is advisable that the members or parts are arranged on the upstream side of the cooling liquid passage in the order of reaching a high temperature or requiring a high cooling effect. In this case, by interchanging the cooling liquid inlet port 25 and the cooling liquid outlet port 26 with each other, that is, by providing the cooling liquid inlet port in the place of the cooling liquid outlet port 26 and providing the cooling liquid outlet port in the place of the cooling liquid inlet port 25 in this embodiment, it is possible to make the cooling liquid 23 flow in the vicinity of the rectifier 30 disposed at the rear of the AC generator 1 for vehicle by the shortest route.

As described above, concerning the construction of the cooling liquid passage, the number of the axial cooling liquid passages 20, the positions of the cooling liquid inlet port 25 and the cooling liquid outlet port 26, and so on a re not limited to those of this embodiment, but they can be changed according to various circumstances related to the cooling such as the heat resistance of each part, and so on.

Further, in the AC generator 1 for vehicle according to this embodiment, the cooling liquid passage may be provided with an orifice at an arbitrary position therein so as to measure the flow rate of the cooling liquid 23 flowing through the cooling liquid passage based on the differential pressure across the orifice. This makes is possible to optimally control the flow rate of the cooling liquid 23 that will come in the cooling liquid passage from the external cooling liquid circulating apparatus (not shown) according to the amount of heat generated at various heating portions. Incidentally, the voltage regulator 31 may be provided with a temperature sensor so as to measure the temperatures of various elements (not shown) constituting the voltage regulator 31, in which case the flow rate of the cooling liquid 23 can be adjusted according to the results of this measurement.

In the present embodiment, the bearing holder portion 14b extending backwards from the end plate portion 2b of the housing 2 along the rotary shaft 9 may be separated from the end plate portion 2b of the housing 2 and it may be formed integrally with the back plate 7 to form a rear bracket. In this case, the structure of the rear portion (rear end portion) of the housing 2 can be simplified while maintaining the above-mentioned cooling liquid passage structure, so that the die-casting mold, casting mold and so on for the housing 2 can be simplified. Therefore, the production cost concerning this matter can be cut down.

Figure 3:
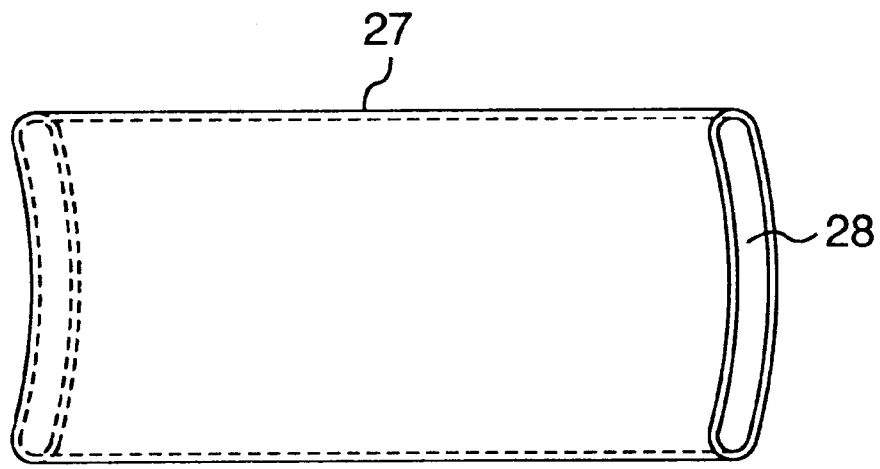
FIG. 3 is a perspective view showing an example of molded cooling pipe.
Figure 4:
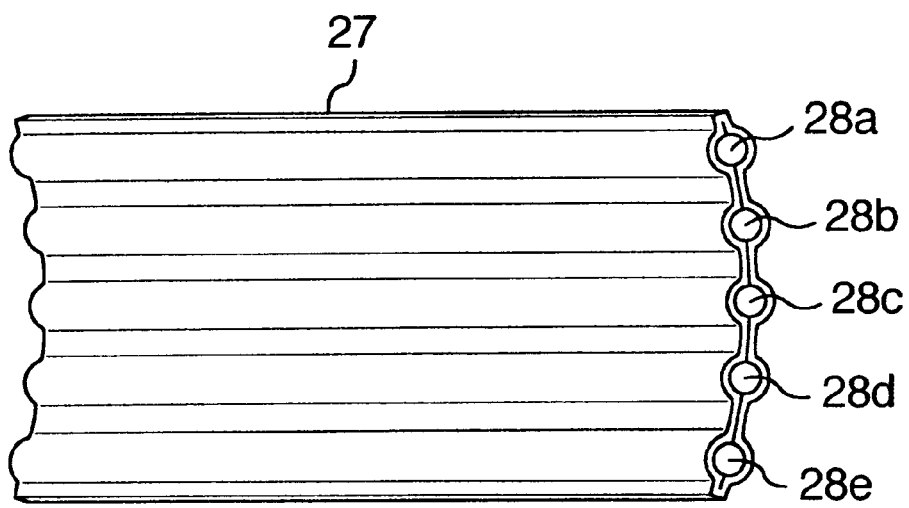
FIG. 4 is a perspective view showing another example of molded cooling pipe.

In addition, in the AC generator 1 for vehicle according to this embodiment, the axial cooling liquid passages 20 may be formed in the wall of the housing 2 in such a manner that a plurality of cooling pipes 27 shown in FIGS. 3, 4 are placed in the mold when forming the housing 2 by die-casting process, casting process, and so on. Through holes 28, 28a–28e shown in FIGS. 3, 4 will constitute the axial cooling liquid passages when the housing 2 is formed. The cooling pipes 27 are integrally cast in the wall of the housing 2, and therefore it is not necessary to form the axial cooling liquid passages 20 directly in the housing 2, and accordingly the die-casting mold, casting mold and so on for the housing 2, which are not shown, can be simplified. In consequence, the production cost concerning this matter can be cut down.

Moreover, changing the configuration of the cooling pipe 27 makes it possible to form the axial cooling liquid passage 20 into an arbitrary shape without being applied with manufactural restrictions related to the die-casting process, casting process, and so on, so that the construction of the cooling liquid passage can be optimized, and therefore it is possible to use the housing 2 in common even for other AC generator 1 for vehicle with different amount of heat generated. Further, even when the housing 2 is made thinner for achieving lightweight, the cooling liquid pipe 27 will make sure of the liquid-tightness, and therefore it is possible to obtain another effect that the leakage of the cooling liquid 23 can be prevented.

Description will be given below of a second embodiment of the AC generator for vehicle according to the present invention with reference to FIG. 5.

Figure 5:
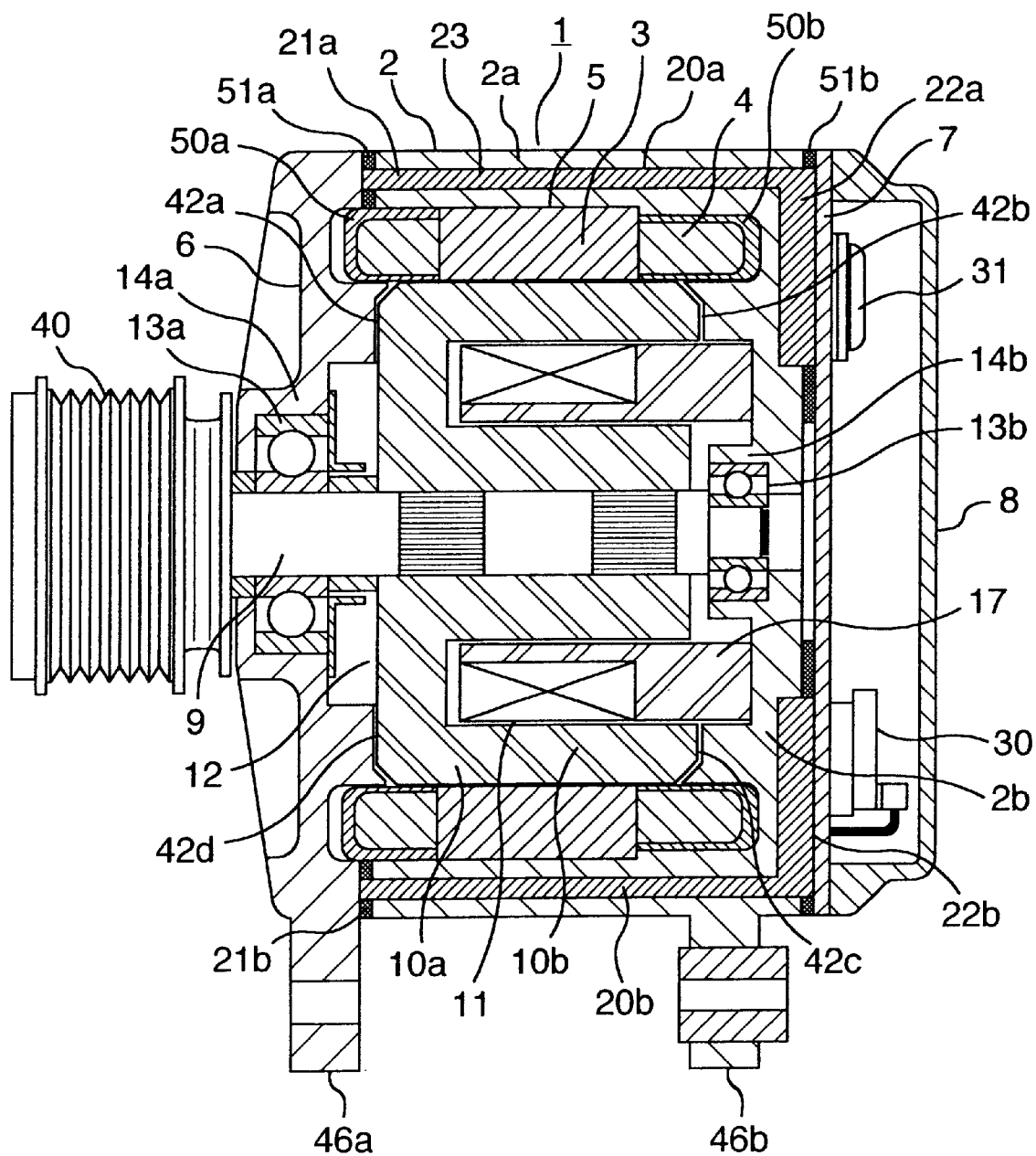
FIG. 5 is a vertically sectioned side view showing a second embodiment of the AC generator for vehicle according to the invention.

FIG. 5 is a vertically sectioned side view showing the AC generator 1 for vehicle according to this embodiment. It is noted that the same portions as those in FIG. 1 are designated by the same reference numerals and description thereof will be omitted. The AC generator 1 for vehicle according to this embodiment differs from the AC generator 1 for vehicle shown in FIG. 1 in that field cores 17 on which the field coils 11 are wound are fitted in the end plate portion 2b of the housing, that the field coils 11 are not wound on the pole core 10, that the brush peripheral equipment 41 through which electric current is applied to the field coils 11 is not provided, and that the voltage regulator 31 is fixed to the back plate 7.

However, the amount of heat generated at various portions at the time of generating electricity is not at all different from the case of the AC generator 1 for vehicle shown in FIG. 1, so that the heating portions, that is, the stator cores 3, the stator coils 4, the rectifier 30 and the voltage regulator 31 can be cooled by forming the same cooling liquid passage, and furthermore it is possible to improve the cooling efficiency, since the voltage regulator 31 is fixed to the back plate 7.

Description will be given below of a third embodiment of the AC generator 1 for vehicle according to the invention with reference to FIG. 6.

Figure 6:
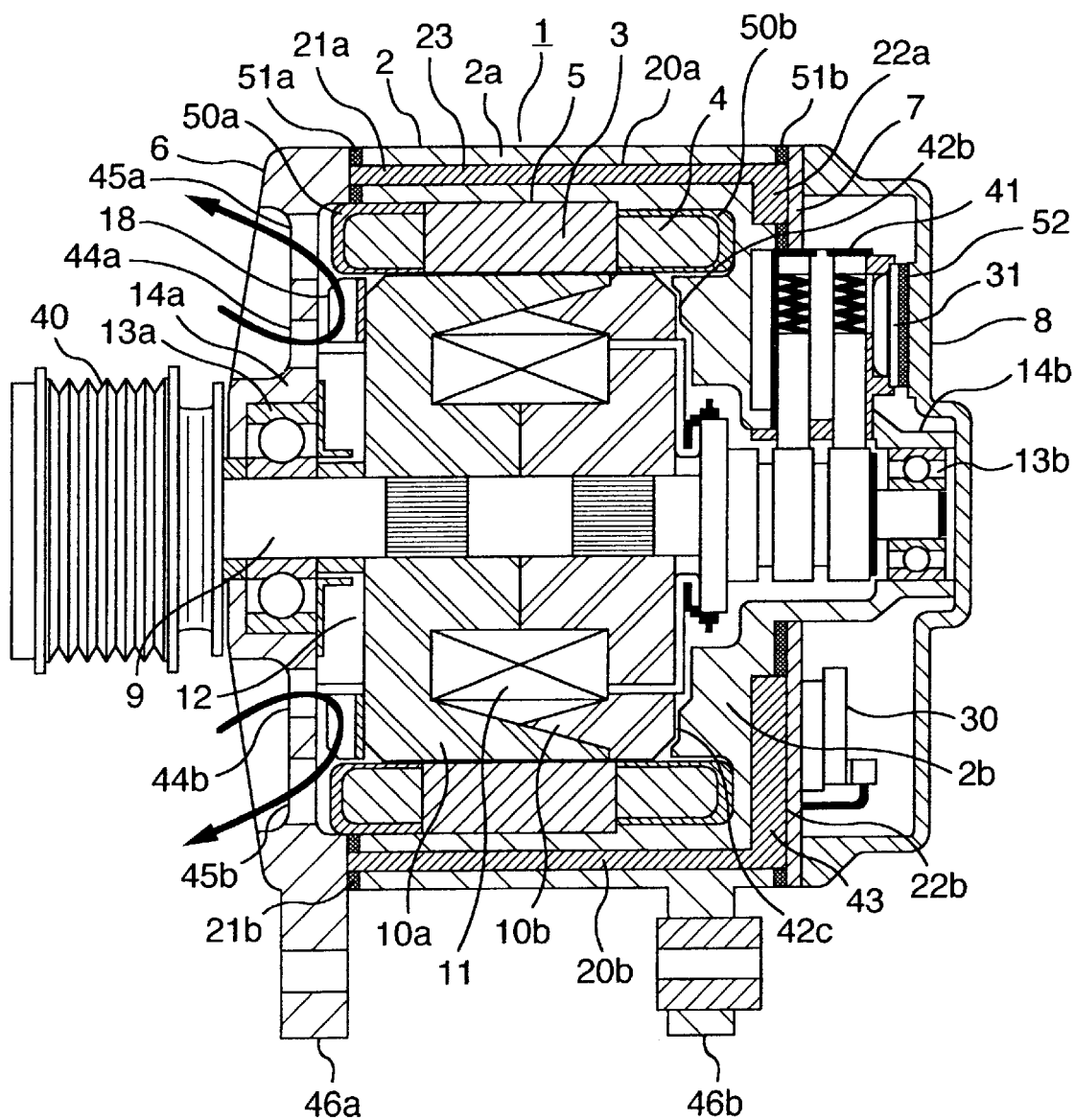
FIG. 6 is a vertically sectioned side view showing a third embodiment of the AC generator for vehicle according to the invention.

FIG. 6 is a vertically sectioned side view showing the AC generator 1 for vehicle according to this embodiment. It is noted that the same portions as those in FIG. 1 are designated by the same reference numerals and description thereof will be omitted. The AC generator 1 for vehicle according to this embodiment differs from the AC generator 1 for vehicle shown in FIG. 1 in that the pole core 10a is provided with a cooling fan 18 on an end surface thereof adjacent to the bracket 6, and that the bracket 6 is formed therein with fresh air inlet ports 44a, 44b and fresh air outlet ports 45a, 45b. Since the cooling fan 18 is provided, there are formed no very small air gaps 42a, 42d between the bracket 6 and the pole core 10a.

In this embodiment, the cooling fan 18 is rotated with the rotor 12 as one body, so that fresh air of relatively low temperature is caused to flow in through the fresh air inlet ports 44a, 44b and then flow out through the fresh air outlet ports 45a, 45b while cooling part of the stator coils 4 as shown by arrow marks in FIG. 6, and therefore the cooling efficiency is improved and hence the reliability can be further improved.

Moreover, the cooling fan may be provided also on the end face of the pole core 10b. In this case, there will be formed no very small air gaps 42b, 42c between the pole core 10b and the end plate portion 2b of the housing 2. The cooling fans provided on the front and rear of the pole cores 10a and 10b are rotated with the rotor 12 as one body, so that the air in the space defined by the housing 2, the bracket 6 and so on is caused to flow to thereby promote the heat conduction and radiation, and therefore the cooling efficiency is improved and hence the reliability can be further improved.

Description will be given below of a fourth embodiment of the AC generator 1 for vehicle according to the invention with reference to FIG. 7.

Figure 7:
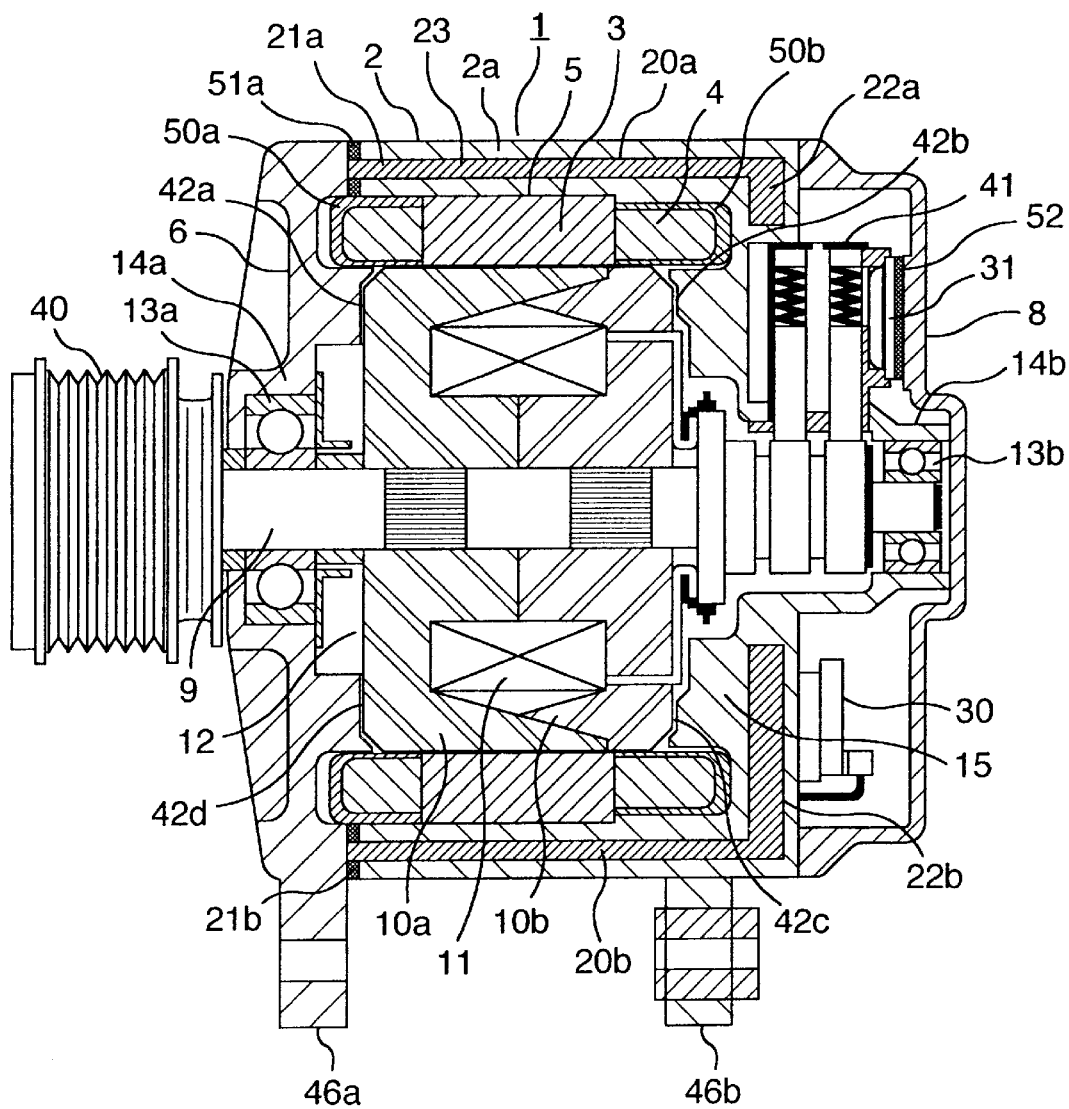
FIG. 7 is a vertically sectioned side view showing a fourth embodiment of the AC generator for vehicle according to the invention.

FIG. 7 is a vertically sectioned side view showing the AC generator 1 for vehicle according to this embodiment. It is noted that the same portions as those in FIG. 1 are designated by the same reference numerals and description thereof will be omitted. The AC generator 1 for vehicle according to this embodiment differs from the AC generator 1 for vehicle shown in FIG. 1 in that the circumferential cooling liquid passages 21 and the radial cooling liquid passages 22 are formed liquid-tightly in the wall of the end plate portion 2b, and that no back plate 7 is fitted to the housing 2 and hence no seals 51a, 51b are provided.

In the AC generator 1 for vehicle according to this embodiment, it is not necessary to liquid-tightly cover the axial cooling liquid passages 20, the circumferential cooling liquid passages 21 and the radial cooling liquid passages 22 and hence there is no need to provide the parts and the seals 51 used for covering them in a liquid tight manner, and therefore it is possible to cut down the production cost. Further, the leakage of the cooling liquid 23 to the inside of the AC generator 1 for vehicle caused by the deterioration of the seals 51 and the like can be kept at a relatively small amount, and therefore it is possible to further improve the reliability.

Incidentally, the circumferential cooling liquid passages 21 and the radial cooling liquid passages 22 can be easily formed provided that, when forming the housing 2 by die-casting process, casting process, and so on, cores, lost wax or the like formed in the same shape as the radial cooling liquid passages 22, which are not shown, are inserted in the corresponding portions of the wall of the end plate portion 2b. Either the circumferential cooling liquid passages 21 or the radial cooling liquid passages 22 may be formed in the same manner as those of the embodiment shown in FIG. 1.

Description of the first to fourth embodiments of the AC generator 1 for vehicle according to the invention has been made above, and however it is possible to suitably combine the constructions described in the aforementioned embodiments depending on the circumstances, such as the required cooling efficiency and reliability, the cost needed for production, and so on. Incidentally, in some cases, the rotor 12 may be provided with a permanent magnet in order to make sure of a higher output of the AC generator 1 for vehicle, in which cases it is possible to maintain the high output constantly without demagnetizing the permanent magnet, because the AC generator 1 for vehicle according to the invention is excellent in cooling efficiency as mentioned above and hence the rotor 12 can be cooled effectively.

What is claimed is:

1. An AC generator for a vehicle having a rotor and a stator to generate electricity by relative motion of said rotor and said stator, comprising: a housing enclosing said rotor and said stator; and a plurality of axial passages formed in said housing at intervals in the circumferential direction, through which a fluid is made to flow in the direction of a rotary shaft of said rotor, wherein said housing is integrally formed therein with at least one passage by means of which said axial passages are connected, said at least one passage connecting said axial passages having a portion extending in a radial direction toward said rotary shaft and another portion extending in the circumferential direction.

2. An AC generator as defined in claim 1, wherein said at least one passage is formed in one of axial end faces of said housing which forms an end plate portion.

3. AnAC generator for a vehicle having a rotor and a stator to generate electricity by relative motion of said rotor and said stator, comprising: a housing enclosing said rotor and said stator; and a plurality of axial passages formed in said housing at intervals in the circumferential direction, through which a fluid is made to flow in the direction of a rotary shaft of said rotor, wherein said housing is integrally formed therein with at least one passage by means of which said axial passages are connected, said at least one passage connecting said axial passages having a portion extending in a radial direction toward said rotary shaft and another portion extending in the circumferential direction;

wherein said at least one passage is formed in one of axial end faces of said housing which forms an end plate portion; and whereinsaid at least one passage formed in said end plate portion is composed of a concave portion formed in an outer surface of the end plate portion and a cover member covering said concave portion.

4. An AC generator as defined in claim 3, wherein a rectifier is disposed on said cover member.

5. AnAC generator as defined in claim 3, whereinanother passage connecting said axial passages is formed in such a manner thatat least a circumferentially extending concave portion is formed in the other end face of said housing so as to connect said axial passages and covered with a bracket for covering said other end face.

6. An AC generator as defined inany one of claims 1–3,wherein said at least one passage connecting said axial passages is covered with said cover member and said bracket through a seal member.

7. AnAC generated as defined in any one of claims 1–3, wherein said end plate portion is provided with a bearing holder portion for supporting said rotary shaft.

8. An AC generator as defined in any one of claims 1–3, wherein said axial passages are formed by a cooling pipe placed in a mold when forming said housing by casting process.

9. An AC generator as defined inany one of claims 1–3, whereinsaid at least one passage connecting said axial passages is provided in said housing in a liquid tight manner.

* * * * *